United States Patent
Wang et al.

(10) Patent No.: US 9,656,243 B2
(45) Date of Patent: May 23, 2017

(54) MESOPOROUS SILICON SYNTHESIS AND APPLICATIONS IN LI-ION BATTERIES AND SOLAR HYDROGEN FUEL CELLS

(71) Applicant: The Penn State Research Foundation, University Park, PA (US)

(72) Inventors: Donghai Wang, State College, PA (US); Fang Dai, State College, PA (US); Ran Yi, State College, PA (US); Jianto Zai, State College, PA (US)

(73) Assignee: The Penn State Research Foundation, University Park, PA (US)

(*) Notice: Subject to any disclaimer, the term of this patent is extended or adjusted under 35 U.S.C. 154(b) by 148 days.

(21) Appl. No.: 14/328,136

(22) Filed: Jul. 10, 2014

(65) Prior Publication Data

US 2015/0017569 A1  Jan. 15, 2015

Related U.S. Application Data

(60) Provisional application No. 61/844,634, filed on Jul. 10, 2013.

(51) Int. Cl.
*H01M 4/38* (2006.01)
*H01M 8/06* (2016.01)
(Continued)

(52) U.S. Cl.
CPC .............. *B01J 21/06* (2013.01); *B01J 35/004* (2013.01); *B01J 35/1019* (2013.01);
(Continued)

(58) Field of Classification Search
CPC ....... H01M 4/38; H01M 4/386; C01B 33/021; C01B 33/033; C03B 19/02; C01P 2006/16
See application file for complete search history.

(56) References Cited

U.S. PATENT DOCUMENTS

| 3,709,833 A * | 1/1973 | Thomas ................ C01B 33/163 502/8 |
| 2008/0038170 A1* | 2/2008 | Sandhage ........... B81C 99/0095 423/155 |

(Continued)

FOREIGN PATENT DOCUMENTS

| CN | 102161488 A | 8/2011 |
| JP | 62123009 A * | 6/1987 |

(Continued)

OTHER PUBLICATIONS

Abstract in English of JP 62-123009, Sudo et al., Jun. 4, 1987.*

(Continued)

*Primary Examiner* — Kenneth Douyette
(74) *Attorney, Agent, or Firm* — Buchanan Ingersoll & Rooney PC

(57) ABSTRACT

We provide a mesoporous silicon material (PSi) prepared via a template-free and HF-free process. The production process is facile and scalable, and it may be conducted under mild reaction conditions. The silicon may be produced directly by the reduction of a silicon-halogenide precursor (for example, $SiCl_4$) with an alkaline alloy (for example, NaK alloy). The resulting Si-salt matrix is then annealed for the pore formation and crystallite growth. Final product is obtained by removal of the salt by-products with water.

20 Claims, 10 Drawing Sheets

(51) Int. Cl.
- *C01B 33/021* (2006.01)
- *B01J 21/06* (2006.01)
- *H01M 8/0606* (2016.01)
- *H01M 4/62* (2006.01)
- *C01B 33/033* (2006.01)
- *B01J 35/00* (2006.01)
- *B01J 35/10* (2006.01)
- *H01M 10/0525* (2010.01)

(52) U.S. Cl.
CPC ....... *B01J 35/1023* (2013.01); *B01J 35/1042* (2013.01); *B01J 35/1047* (2013.01); *B01J 35/1061* (2013.01); *C01B 33/033* (2013.01); *H01M 4/386* (2013.01); *H01M 4/622* (2013.01); *H01M 8/0606* (2013.01); *H01M 4/623* (2013.01); *H01M 10/0525* (2013.01); *Y02E 60/324* (2013.01); *Y02P 70/56* (2015.11)

(56) References Cited

U.S. PATENT DOCUMENTS

| | | | |
|---|---|---|---|
| 2008/0145757 A1* | 6/2008 | Mah | H01M 4/133 429/219 |
| 2009/0029256 A1 | 1/2009 | Mah et al. | |
| 2010/0154475 A1* | 6/2010 | Matheson | C01B 33/033 65/33.2 |
| 2011/0160104 A1* | 6/2011 | Wu | C04B 35/195 507/269 |
| 2012/0244436 A1 | 9/2012 | Kerlau | |
| 2012/0244438 A1* | 9/2012 | Kerlau | H01M 4/134 429/213 |

FOREIGN PATENT DOCUMENTS

| | | |
|---|---|---|
| RU | 2181104 C2 | 4/2002 |
| WO | 2011156419 A2 | 12/2011 |
| WO | 2012028857 A1 | 3/2012 |

OTHER PUBLICATIONS

International Search Report and Written Opinion for PCT/US2014/046145 dated Nov. 6, 2014.

Bao, Zhihao, et al., Chemical reduction of three-dimensional silica micro-assemblies into microporous silicon replicas, lature, Mar. 8, 2007, pp. 172-175, vol. 446, Nature Publishing Group.

Dongyun, Chen, Synthesis and Characterization of Metal Oxide-Based Core-Shell Multifunctional Nanocomposites, Chinese Doctoral Dissertations Full-Text Database, Engineering Technology, 2013, pp. B020-36, vol. 1, No. 2.

Mathews, N. R., et al., Photoelectrochemical Characterization of Porous Si, International Journal of Hydrogen Energy, 2003, pp. 629-632, vol. 28, Elsevier Science Ltd.

State Intellectual Property Office of the People's Republic of China, Notification of the First Office Action for Application No. 201480038835A, dated Jan. 19, 2017.

* cited by examiner

US 9,656,243 B2

MESOPOROUS SILICON SYNTHESIS AND APPLICATIONS IN LI-ION BATTERIES AND SOLAR HYDROGEN FUEL CELLS

CROSS-REFERENCE TO RELATED APPLICATIONS

This application claims priority to U.S. Provisional Patent Application No. 61/844,634, filed on Jul. 10, 2013. That application is incorporated by reference herein.

STATEMENT REGARDING FEDERALLY SPONSORED RESEARCH OR DEVELOPMENT

This invention was made with government support under Grant No. DE-AC02-05CH11231, awarded by the Department of Energy. The Government has certain rights in the invention.

BACKGROUND OF THE INVENTION

Field of the Invention

Embodiments of the invention relate to synthesis and use of porous silicon materials.

Background of the Related Art

As a typical kind of porous semiconducting material, porous silicon materials have been long studied due to their special chemical and physical properties and wide applications in different areas. For example, porous silicon materials are deeply investigated in optoelectronic and censoring due to their light-emitting properties. Porous silicon materials are also used in drug and gene delivery research because of their high porosity and bio-compatibility. In addition, potential applications of porous silicon materials in food fortification are being explored.

In addition to its attractiveness for use in the above applications, porous silicon has gained popularity in the field of lithium-ion ("Li-ion") batteries. This is due to the use of silicon-based anode materials. The porous structure is considered as an effective way to compensate for the huge volume change (about 300%) of the silicon anode during the electrochemical process. This tends to provide better performance than non-porous anode materials.

There are two well-established techniques to produce porous silicon materials. These are anodization and stain etching, specifically. Unfortunately, both methods require a solid crystallized silicon precursor. This results in a corresponding low porosity yield. In addition, both methods need large volumes of hydrofluoric acid ("HF"), which is difficult to safely handle and is not environmentally friendly. Both disadvantages made these two methods high-cost and low-efficiency.

Some alternative preparations that avoid using a solid silicon precursor were reported in recent years. These include chemical reduction of porous silicon, and thermal annealing followed by hydrofluoric acid etching with templates. Pre-formed porous precursor or pore templates are still necessary in the process to obtain the pores. Unfortunately hydrofluoric acid, with its many disadvantages, is still required.

BRIEF SUMMARY OF THE INVENTION

We report a micro-sized mesoporous silicon. By "micro-sized" we mean that the average particle diameter is one micron or less. "Porous" is used broadly, and includes materials with pores, vacancies, or voids. Porous materials with a mean pore size ranging from 2 to 50 nm in diameter are typically referred to as "mesoporous." According to embodiments of the invention, a porous silicon material (PSi) may be prepared via a template-free and HF-free process. (This does not, however, exclude further processing by HF to remove surface coatings from the already formed silicon, as set forth below.)

The production process is facile and scalable. It may be conducted under mild reaction conditions. The silicon may be produced directly by the reduction of a silicon-halogenide precursor (for example, $SiCl_4$) with alkaline alloy (for example, NaK alloy). The resulting Si-salt matrix is then annealed for the pore formation and crystallite growth. Final product is obtained by removal of the salt by-products with water.

The micro-sized material typically obtained by operation of the methods reported herein shows a surface area of between 220 and 580 $m^2$ $g^{-1}$. In some embodiments the surface area may be between 250 and 550 $m^2$ $g^{-1}$; 300 and 525 $m^2$ $g^{-1}$; 350 and 525 $m^2$ $g^{-1}$; 400 and 525 $m^2$ $g^{-1}$; or 490 and 510 $m^2$ $g^{-1}$. In a particularly preferred embodiment the surface area is 496.8 $m^2$ $g^{-1}$. Typical embodiments also show a total pore volume of between 0.86 and 1.44 $cm^3$ $g^{-1}$. Other embodiments may show total pore volume between 0.90 and 1.50 $cm^3$ $g^{-1}$. In a preferred embodiment the pore volume is 1.44 $cm^3$ $g^{-1}$. The pores are typically mesopores of an average of 10 nm in diameter. In some embodiments the average pore diameter is between 8 and 12 nm. Primary crystallite units are typically nano-sized, with an average size of less than 10 nanometers. In some embodiments they have an average size of less than 8 nm, less than 6 nm, or less than 4 nm.

DETAILED DESCRIPTION OF THE INVENTION

Figure 1A:
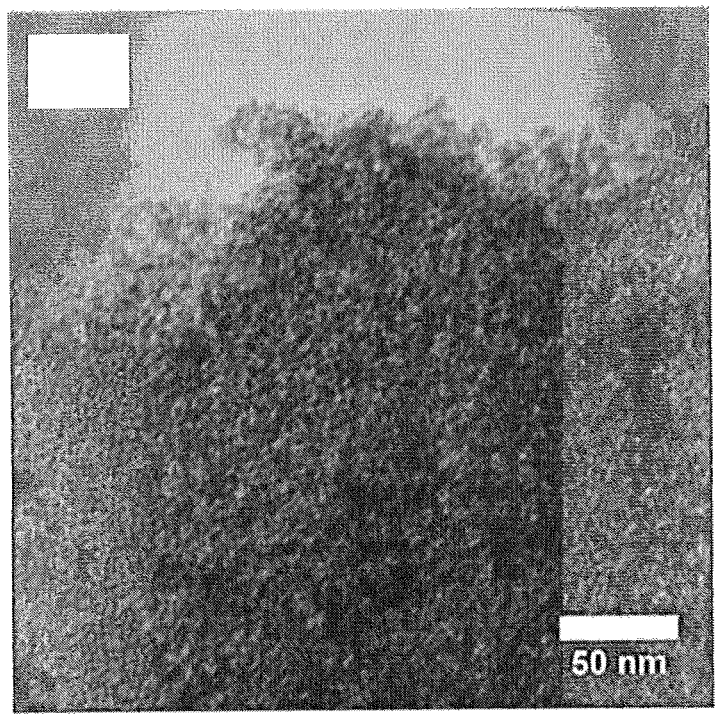
FIGS. 1A, 1B, 1C, 1D, 1E, and 1F show results of a variety of analytical techniques applied to porous silicon produced according to an embodiment of the invention.
Figure 1B:
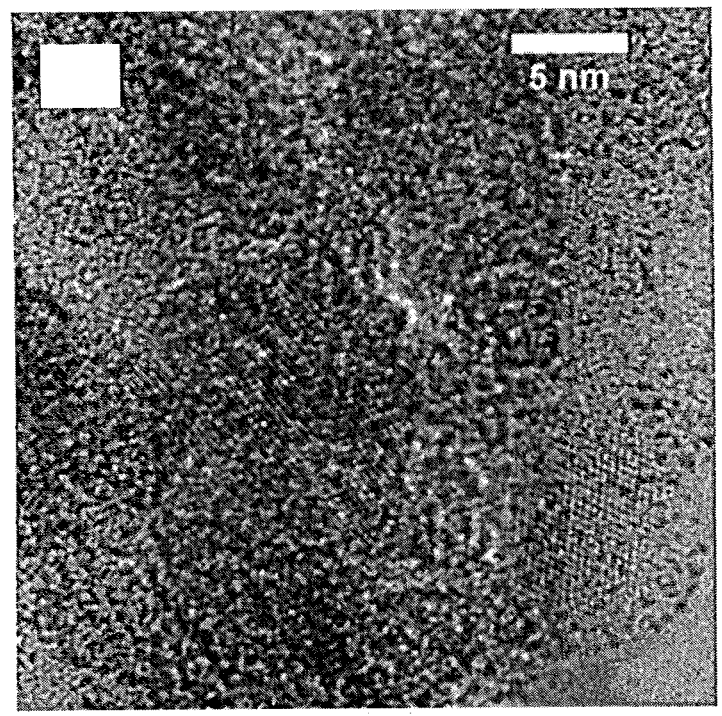

Embodiments of the invention provide methods of synthesis and use of micro-sized mesoporous silicon. Various compositions, methods and uses will be described below.

Synthesis and Characterization

A synthesis route for a preferred embodiment of the invention is shown in Scheme 1. Silicon was produced by reduction of $SiCl_4$ with alkaline alloy reductant NaK. To obtain meso-porous silicon materials with pore size <20 nm (measured as average pore diameter), no external templates are needed. The pore size may be confirmed by TEM microscopy and calculated results from nitrogen sorption measurement using the Barrett-Joynes-Halenda (BJH) method. The reaction can be processed under heat at temperatures of between 20-110° C. In other embodiments the temperature is between 60-100° C.

The Si silicon from reduction is amorphous. To minimize the oxidation of Si with $H_2O$ during the salt removal process, the raw material is treated by calcination to form a crystalline framework, which provides kinetically slower reactivity toward water and air than that of amorphous Si. Different calcination temperatures result in different particle size and pore size. Calcination may be conducted, for example, at temperatures from 600° C. to 950° C. This creates a series of mesoporous Si with different BET (Brunauer-Emmett-Teller method) surface areas. The PSi material is obtained by removal of salt by-products with deionized water.

Herein the terminology "PSi-XXX" is used, wherein "XXX" is a number. This denotes the calcination temperature. Therefore, PSi-600 shows a calcination temperature of 600° C.

A more general synthesis scheme for compositions as reported herein is shown in Scheme 2. In this scheme silicon is produced by reduction of halogenated silicon with an alkaline-based reductant. No template is necessary. The halogenated silicon may be, for example, silicon tetrabromide, silicon tetrafluoride, silicon tetraiodide, or silicon tetrachloride. All of the halogen atoms need not be the same; for example, $SiFCl_3$ or $SiI_2Cl_2$ may also be used. This is normally conducted in an organic solvent. Toluene is one example of a suitable solvent. Other suitable solvents include, for example, but are not limited to, tetrahydrofuran (THF) and pentane.

The alkaline metal-based reductant may be, for example, sodium metal (Na), and/or sodium naphthanide ($NaC_{10}H_8$). One preferred reductant is sodium-potassium alloy (NaK). Although any NaK may be used, in some embodiments the NaK has silicon-halogenide to potassium ratio of 1:4.

The following calcination process is typically used during methods as reported herein. The calcination temperature ranges from 600° C. to 950° C. In some embodiments the temperature ranges between 650° C. and 900° C.; or 700° C. and 800° C. The calcination process is typically taken under inert gas environment (e.g., either nitrogen or argon gas) to prevent the oxidation of the materials. Typically once the porous silicon material has been formed it is washed with water to remove salts. Other salt removal techniques may also be used, such as HF solution etching or thermal salt sublimation.

To obtain mesoporous silicon materials with pore size >20 nm, external $SiO_2$ templates are typically used. The synthesis is the same as described above, though with the addition of templates as indicated below. The external $SiO_2$ templates are commercially available. For example, they may be obtained from Sigma-Aldrich. The external templates are mixed with $SiCl_4$ precursor (or another halogenated silicon precursor) and the mixture is reduced by NaK alloy (or another alkaline alloy reductant) in toluene (or another organic solvent) with or without reflux. As with the template-free synthesis reported above, calcination is required for the template process to obtain crystalline product.

Different calcination temperatures (for example, different temperatures between 600° C. and 950° C.) result in different particle size and pore size, with higher temperatures tending to lead to larger particle size and larger pore size. This allows embodiments of the invention to provide a series of mesoporous silicon materials with different BET surface areas. In still further embodiments, n-type and p-type mesoporous Si materials can be obtained by mixing the halogenide precursor of corresponding doping elements. For example, by using $BCl_3$ as the co-precursor, p-type mesoporous Si will be achieved. In another embodiment, n-type mesoporous Si can be prepared with $PCl_3$ as the co-precursor. External $SiO_2$ templates are optional due to the need of the desired pore size. The synthesis procedures are the same as described previously.

Scheme 1. Illustration synthesis route of PSi

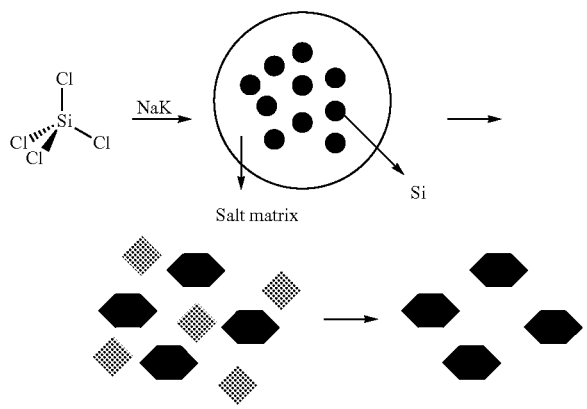

Scheme 2. Illustration of general synthesis of porous silicon

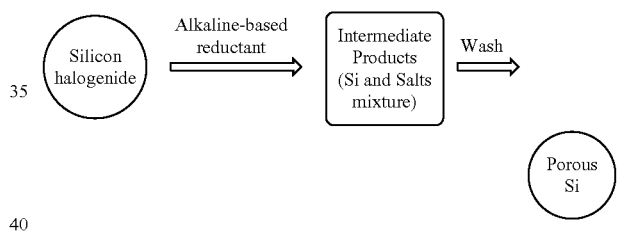

In a preferred embodiment of the invention, a silicon produced by the method described above (in particular the initial method), Brunauer-Emmett-Teller (BET) surface area analysis indicates a high surface area of 496.8 $m^2$ $g^{-1}$ (1152 $m^2$ $cm^{-3}$) of the resulting porous silicon (PSi-600).

The BET surface area that we have achieved is substantially and surprisingly greater than those that have been achieved previously. Most reported porous silicon materials have a surface area ranging from 100 $m^2$ $g^{-1}$ to 300 $m^2$ $g^{-1}$. Only few were reported with surface areas as high as around 500 $m^2$ $g^{-1}$. In some embodiments our silicas have a BET surface area greater than 550 $m^2$ $g^{-1}$. The highest value obtained by our novel method reaches 580 $m^2$ $g^{-1}$, which is the highest among all reported meso-porous silicon materials. This is almost 20% greater than the greatest value that has been reported, and almost 100% more than the high end of the average range.

Although the materials obtained from our method are defined as porous silicon, we emphasize that the material structure, as well as pore structure, is different from other porous silicon materials. Here the definition of "porous" should be read broadly. Any materials with many pores or vacants or voids can be defined as porous structure. In addition, the concept mesoporous is based on the pore size of the materials. All the porous materials with a pore size ranging from 2 to 50 nm are mesoporous structure.

Figure 1C:
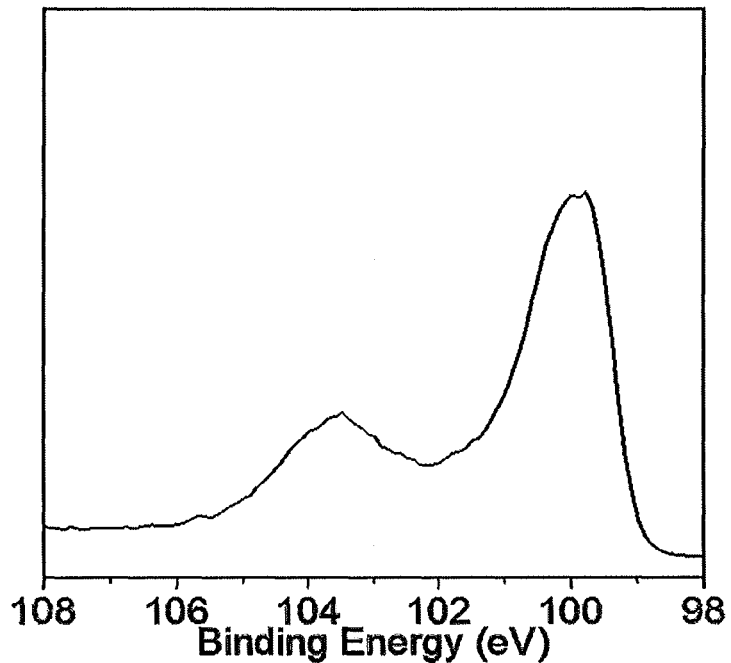
Figure 1D:
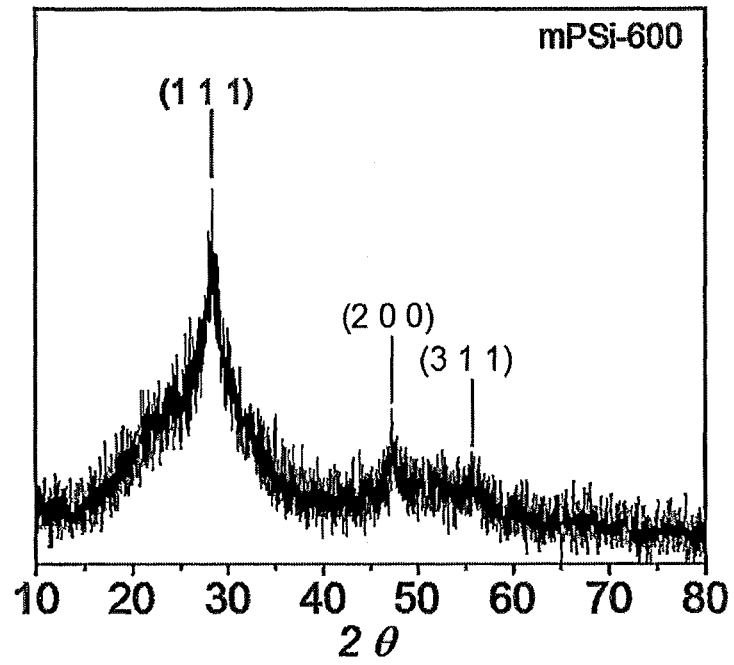
Figure 2A:
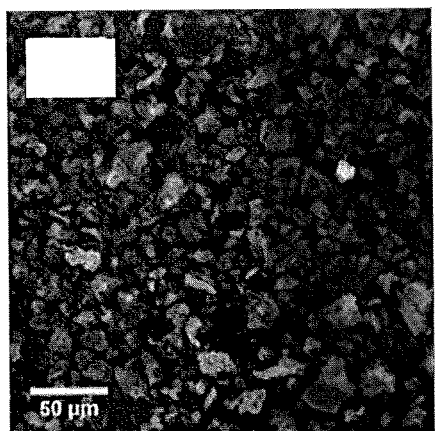
FIG. 2A shows an SEM image of PSi-600.
Figure 2B:
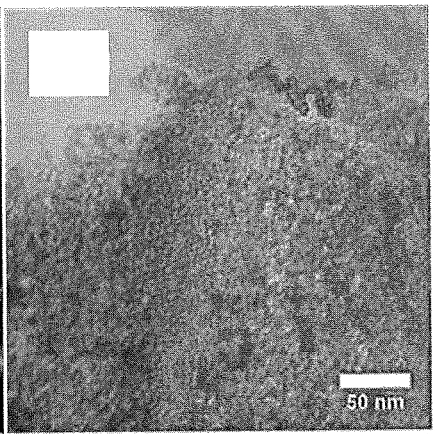
FIG. 2B shows a TEM image of PSi-600.
Figure 2C:
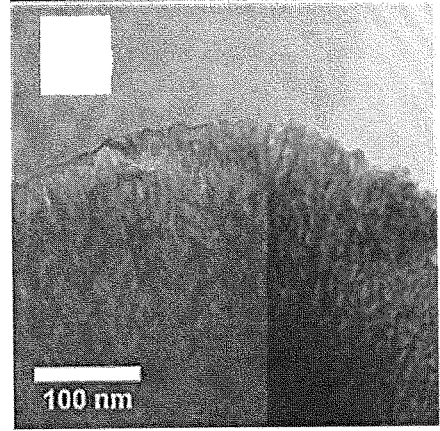
FIG. 2C shows a TEM image of PSi-700.
Figure 2D:
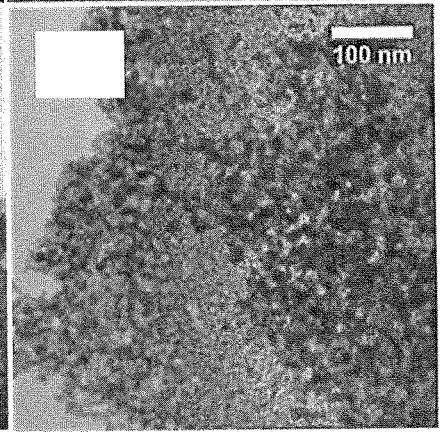
FIG. 2D shows a TEM image of PSi-820.

A number of other analytical methods may be applied to confirm the quality and consistency of the porous silicon materials. A transmission electron microscope (TEM) image as shown in FIG. 2A demonstrates that the porous material particles included nano-sized interconnected crystalline units and mostly uniform meso-pores. The high-resolution TEM image of PSi-600 suggests the crystalline particles. The X-ray powder diffraction (XRD) pattern of PSi-600 shows crystalline phases that are assigned as silicon (FIG. 1C, JCPDS Card No. 27-1402 and space group Fd3m [227]). The X-ray photoelectron spectroscopy (XPS) characterization result is shown in FIG. 1D. The peaks appearing at 100 eV and 104 eV are assigned to Si (0) and Si (4+), respectively. The binding energies in between correspond to $SiO_x$ (0<x<2). The appearance of the surface oxides, which is commonly observed in silicon nanoparticles, is also confirmed by the Raman spectrum, in which a peak shoulder appeared around 350 cm$^{-1}$ attributed to amorphous $SiO_x$ (0<x<2) and $SiO_2$ was observed.

Figure 1E:
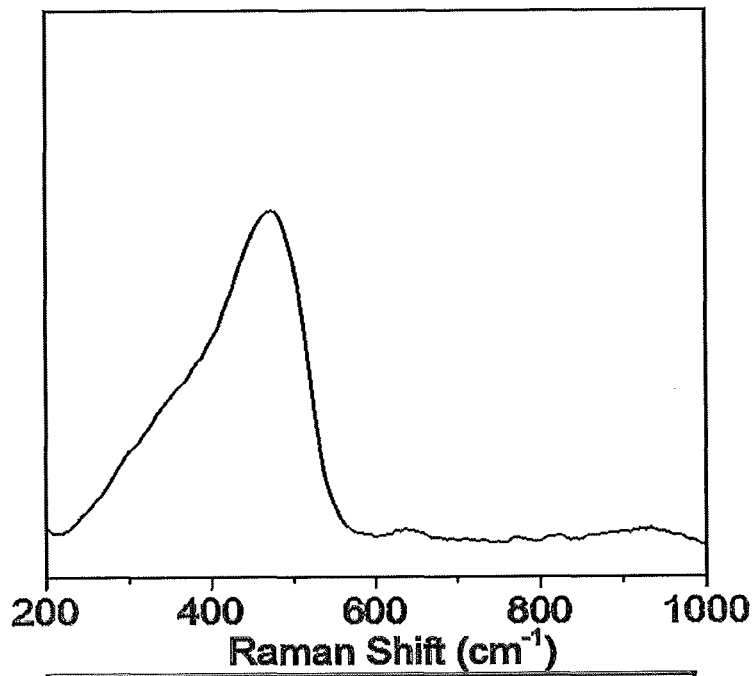
Figure 1F:
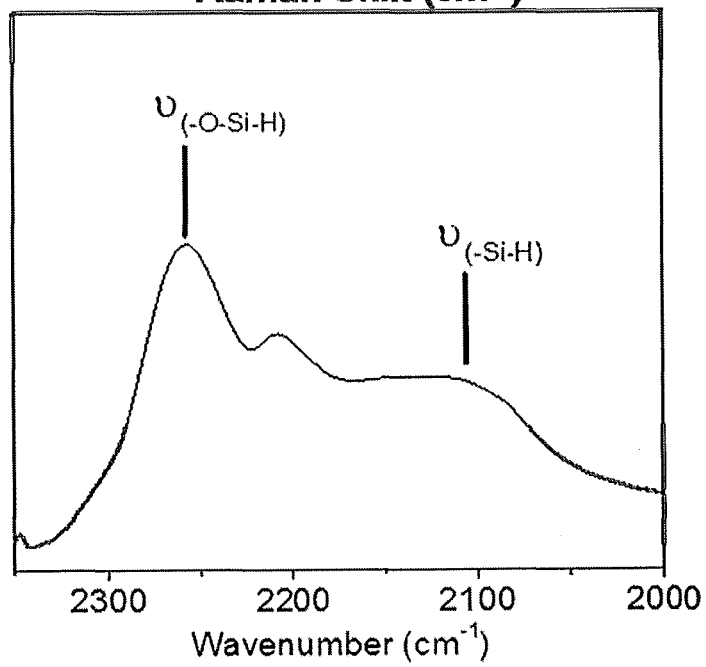

The Raman spectrum (FIG. 1E) of the PSi-600 also shows a broad peaks at 480 cm$^{-1}$, which are considered as a layer of amorphous Si covering the crystalline core. As do other porous silicon materials, the PSi-600 also contains a terminal Si—H structure, which is confirmed by infrared spectroscopy (FIG. 1F, $v_{Si-H}$ at 2100 cm$^{-1}$ and $v_{O-Si-H}$ at 2257 cm$^{-1}$).

According to all characterization results, the structure of the PSi material can be described as a porous micro-sized particle composed of nano-sized crystalline units and mesoopores, which are pores that have a typical pore diameter between 2 and 50 nm. The structure of PSi may be contrasted with the structure of a Si—C composite reported in R. Yi, F. Dai, M. L. Gordin, S. Chen, D. Wang, *Adv Energy Mater* 2012. Both of the materials have the similar primary unit size and pore size. However, the mesopores of the PSi are much more ordered and evenly distributed than those of the Si—C composite. In addition, the total pore volume of PSi (1.44 cm$^3$ g$^{-1}$) is much higher than that of Si—C composite.

Electrochemical Performance as Li-Ion Battery Anode

One particularly useful application of porous silicon as reported here is in an anode in a Li-ion battery. These anodes may be constructed, for example, by mixing the porous silicon with polymer binder and conductive carbon. Suitable polymer binders include, for example, but are not limited to polyacrylic acid (PAA), carboxymethyl cellulose sodium salt (NaCMC), and polyvinylidene fluoride (PVDF)). The mixture may be coated on the surface of copper foil. The PSi material may also be coated with a thin layer of carbon by thermal deposition of acetylene before an electrochemical performance test.

Figure 3A:
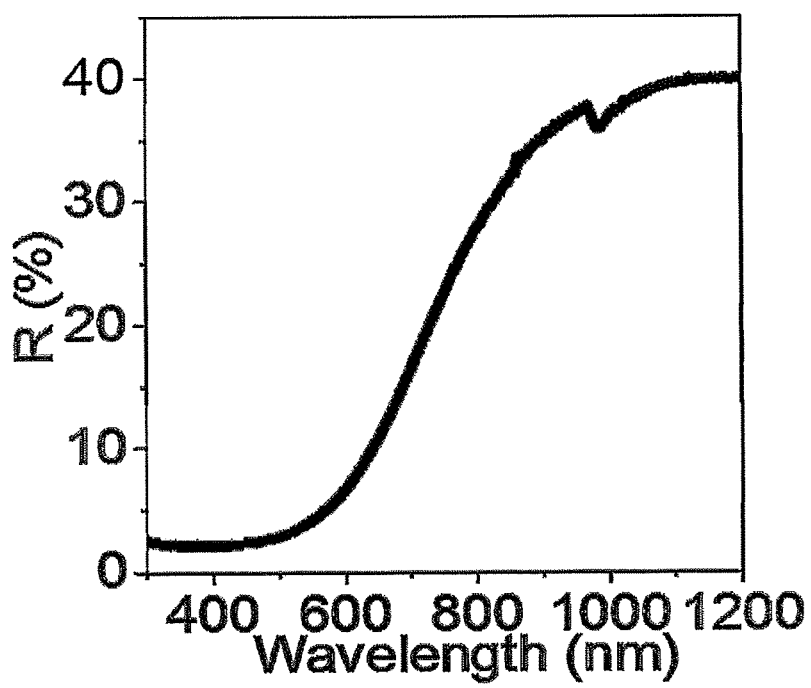
FIG. 3A shows a UV-vis diffuse reflectance spectrum for an embodiment of the invention as discussed below.
Figure 3B:
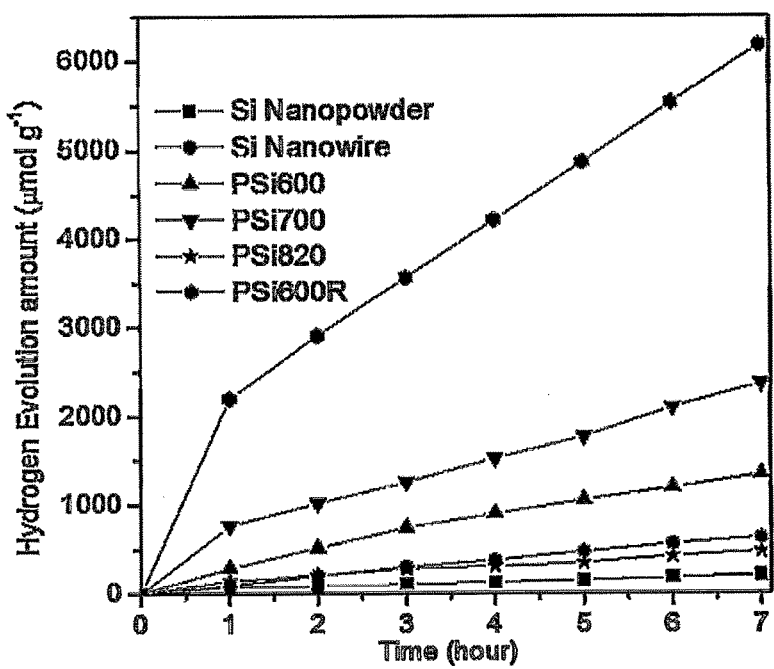
FIGS. 3B, 3C, and 3D show hydrogen evolution over time in embodiments as discussed below.

The electrochemical performance of the PSi and PSi/C material as an anode for Li-ion batteries may be tested using CR2016 coin-type half-cells. Anodes according to embodiments of the invention may be tested by running multiple cycles of charging and discharging. For a typical test, the discharge-charge profiles of electrodes during the 1st, 10th, 50th, and 100th cycles at 1 Ag$^{-1}$ between 0.01 V and 1.5 V are shown in FIG. 3A.

Figure 4A:
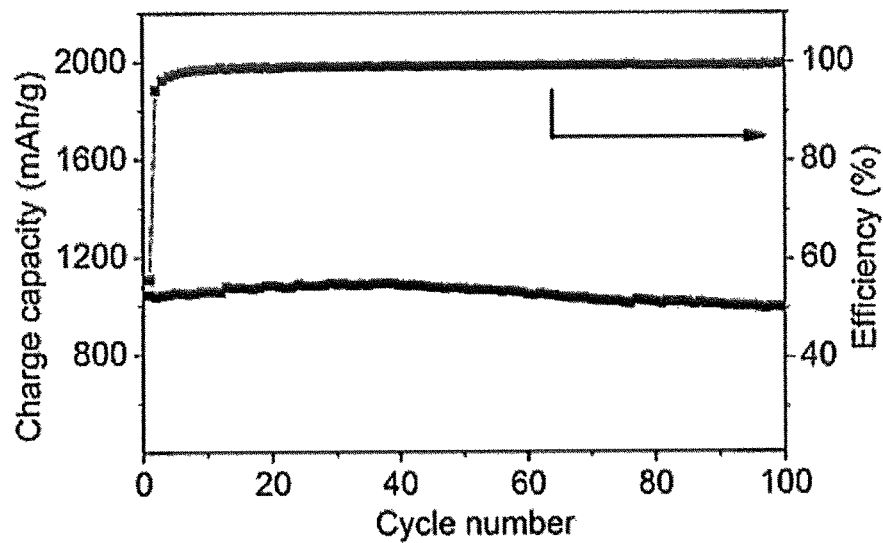
FIGS. 4A, 4B, and 4C shows electrochemical performances of batteries including silicon of embodiments of the invention. 4D shows the electrochemical performance of the sample prepared at 820° C.
Figure 4B:
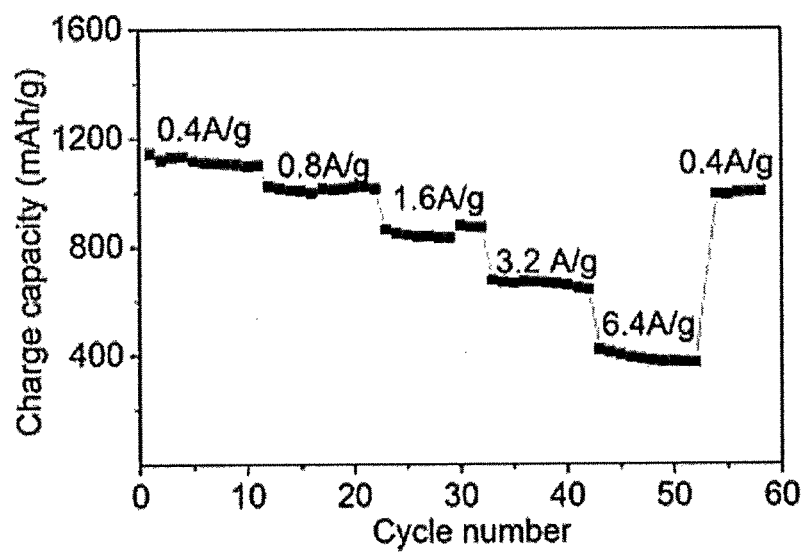

The initial discharge and charge capacity are 1862 mAhg$^{-1}$ and 1044 mAhg$^{-1}$ (2482 mAhg$^{-1}$ and 1392 mAhg$^{-1}$ according to Si, at current density of 0.4 Ag$^{-1}$), giving a coulombic efficiency of 56%. The discharge-charge profiles show little change from the 10th cycle to the 100th cycle. The cycling performance of the PSi/C anode between 0.01V and 1.5V is shown in FIG. 4B. After 100 cycles, the material shows a reversible capacity of 990 mAhg$^{-1}$ (1320 mAhg$^{-1}$ based on Si) with capacity retention of 94.8%. The coulombic efficiencies reach 99% after 10 cycles and remain at >99%. The rate performance of the PSi/C anode was also tested at current densities of 0.4 Ag$^{-1}$, 0.8 Ag$^{-1}$, 1.6 Ag$^{-1}$, 3.2 Ag$^{-1}$, and 6.4 Ag$^{-1}$.

Figure 3C:
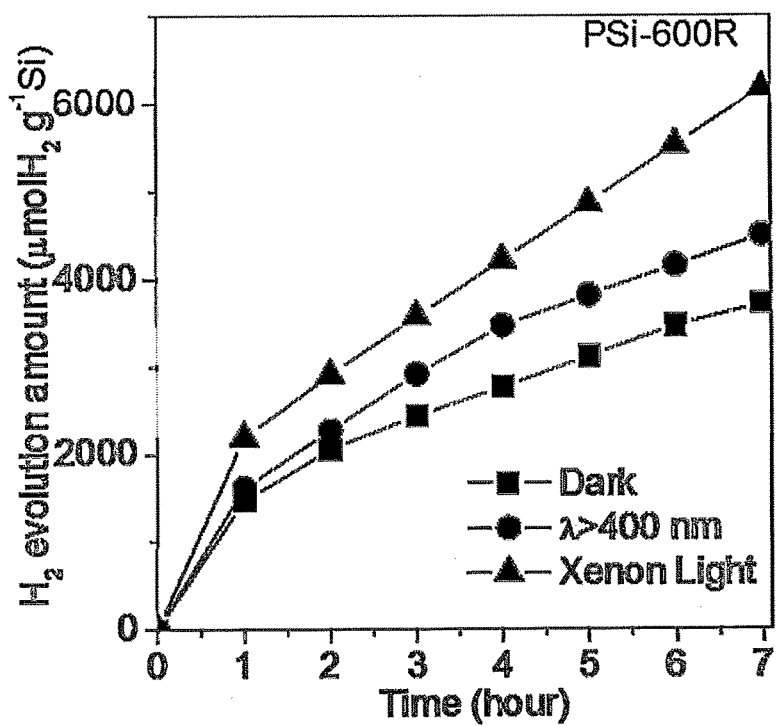
Figure 3D:
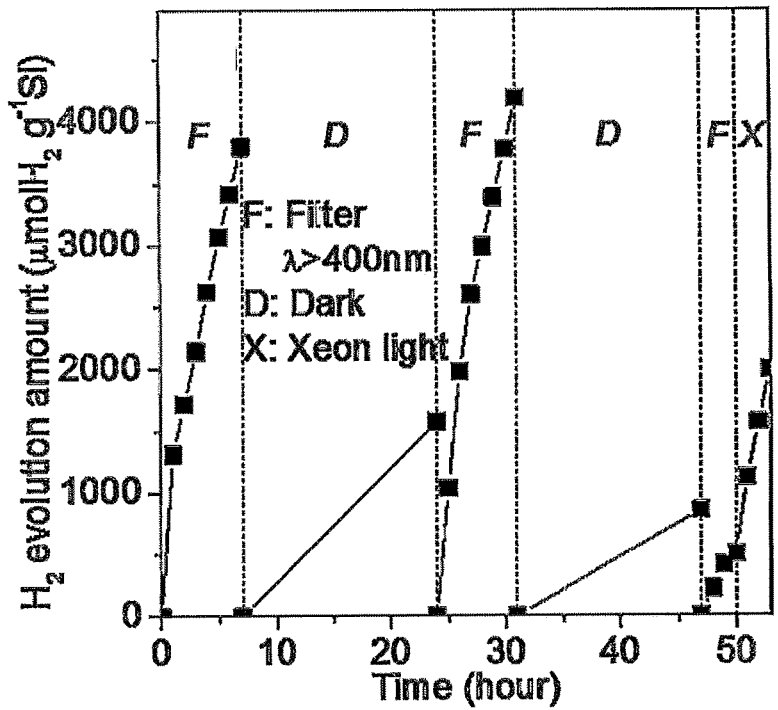

The results are shown in FIG. 3C. The capacity at current density of 6.4 Ag$^{-1}$ is 395 mAhg$^{-1}$, which is superior to the theoretical capacity of graphite. A capacity of 1032 mAhg$^{-1}$ recovers when the current density is reset to 0.4 mAhg$^{-1}$ after 55 cycles, showing the good reversibility of the PSi/C anode material. An electrochemical performance comparison between the PSi/C anode and 820° C. product was also made. The 820° C. product shows a higher initial capacity of 2060 mAhg$^{-1}$, however, with poorer capacity retention which is due to the fast capacity fade. The capacity of the 820° C. product dropped below 380 mAhg$^{-1}$ only within 40 cycles.

Solar Hydrogen Evolution

Silicon prepared according to the teachings herein may be particularly suitable for use with solar hydrogen evolution applications, which involve the use of solar energy to catalyze the split of water into oxygen and hydrogen gas. The hydrogen gas may then be used as a fuel. Typically silicon is excellent for capturing photons up to the red part in the visible light area of the solar spectrum. Photoelectrodes based on silicon have been prepared by bottom-up chemical methods, electrochemical or chemical etching methods have been proved to be efficient photoelectrochemical solar hydrogen evolution. However, there are few reports on photocatalytic solar hydrogen evolution. The limitation is mainly due to the small energy gap between band edge and H$^+$/H$_2$ potential, as well as short working life.

The porous silicons prepared herein may have an enlarged band gap relative to other silicons, and this may increase efficiency when used with the solar applications. With an enlarged band gap of 1.63 eV, which is calculated according to the UV-vis diffuse reflectance spectrum (FIG. 4A), PSi-600 was tested for photocatalytic hydrogen evolution performances (see experimental parts). FIG. 4B shows the typical reaction time course of the photocatalytic H$_2$ evolution of different non-loaded PSi materials. PSi-600 shows a H$_2$ generation amount of 1341 μmol H$_2$ g$^{-1}$ Si in 7 hours, which is higher than that of a typical Si nanopowder (206 μmolH$_2$ g$^{-1}$Si).

The photocatalytic activities are usually affected by the step of light absorption, photogenerated charge pairs separation, the amount of surface active sites, and the migration and recombination rate of photogenerated charges. According to our spectroscopy characterization, the PSi-600 contains a surface oxide layer as well as few amorphous silicon layers, which may prevent the migration of photogenerated charges and enhance the re-combination of the electrons and holes. Surface oxides are typically understood to have a detrimental effect on solar uses of silicon, due to creation of a covering that reduces active sites and lowers photocatalytic performance. Therefore in consideration of this effect the surface may be washed by HF to remove the surface oxides and amorphous silicon.

Figure 5A:
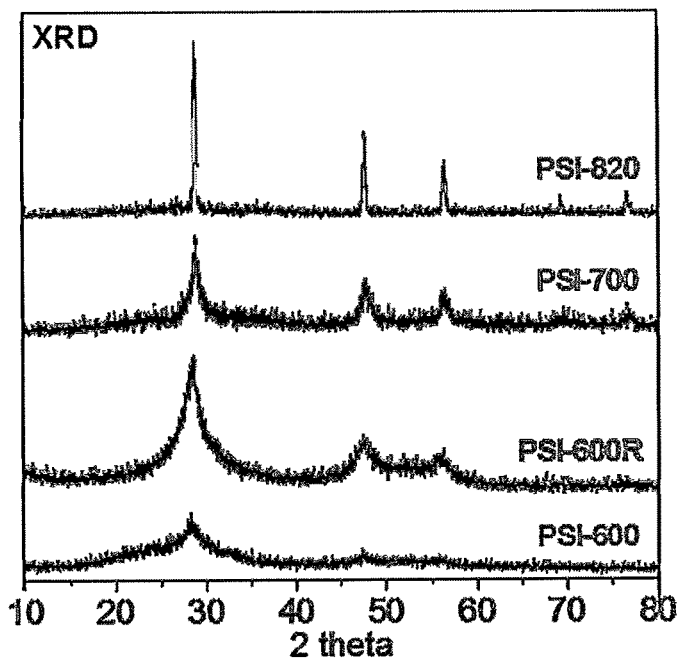
FIGS. 5A, 5B, and 5C show characterizations of some mPSi materials, including PSi-600, PSi-700, PSi-820 and PSi-600R.
Figure 5B:
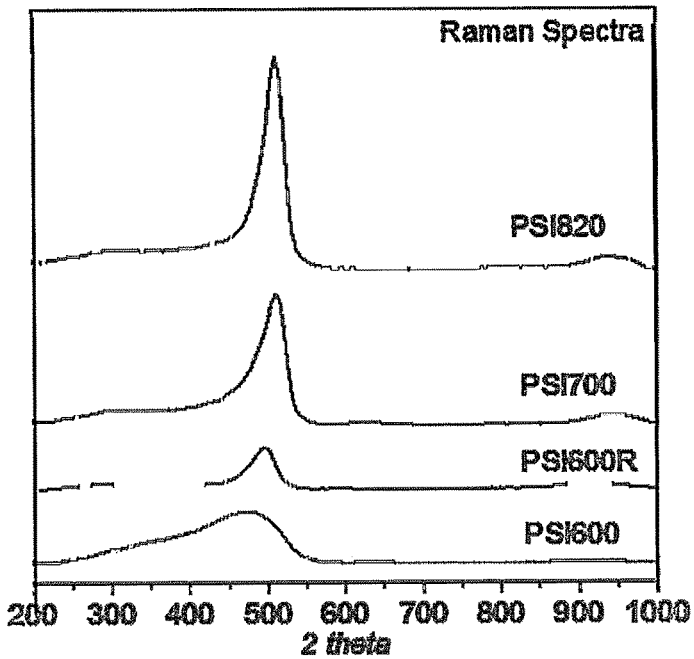
Figure 5C:
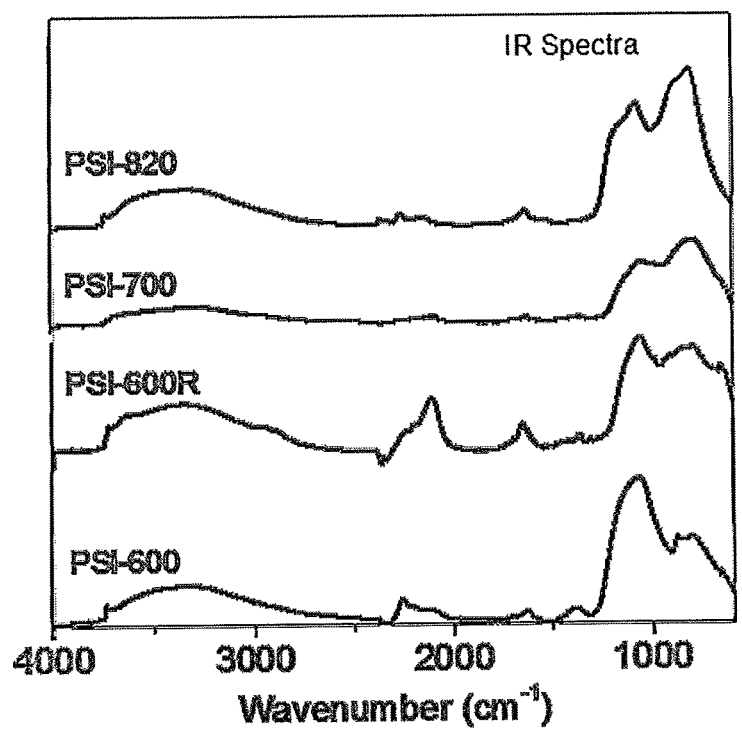

The resulting material (PSi-600R) when characterized by Raman, IR and XRD spectroscopy (as shown in FIG. 5) demonstrates less surface oxides and a better crystalline phase. The BET surface area of PSi-600R is slightly increased to 580 m$^3$ g$^{-1}$. As a result, the photocatalytic activity of PSi-600R increased to 882 μmol g$^{-1}$ h$^{-1}$, which is much improved and comparable with other unloaded photocatalyst (e.g. MoS$_2$/TiO$_2$, (AgIn)$_x$Zn$_2$(1-x)S$_2$, Cu$_3$SnS$_4$) for solar H$_2$ evolution.

Figure 4C:
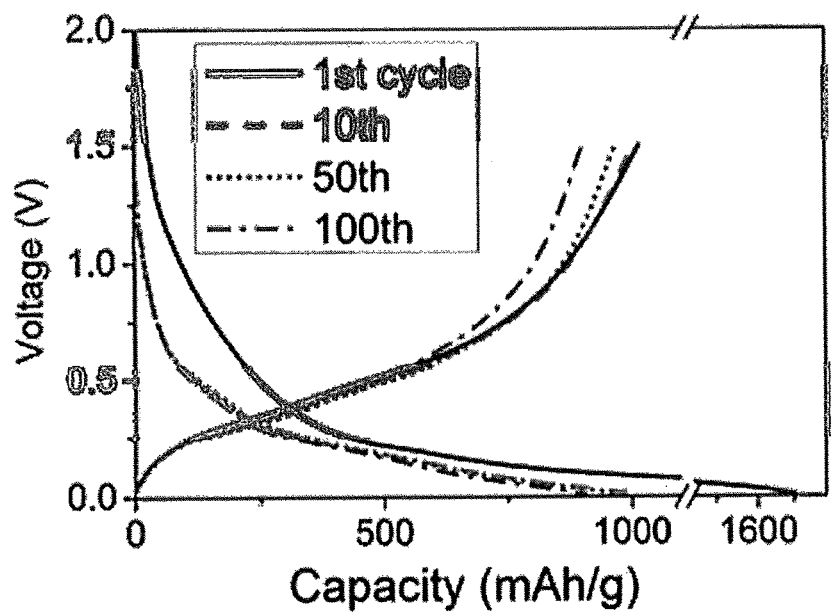

Silicon produced according to embodiments of the invention exhibits photocatalytic activity under different illumination conditions than those of other silicon sources. Unlike other tested samples, PSi-600R showed reactivity towards water even under dark conditions (FIG. 4C). In general, the natural oxidation of silicon by water is slow. The increased reaction rate of PSi-600R, however, is likely due to the enlarged surface area, which provides extra contact between the silicon and water.

Figure 4D:
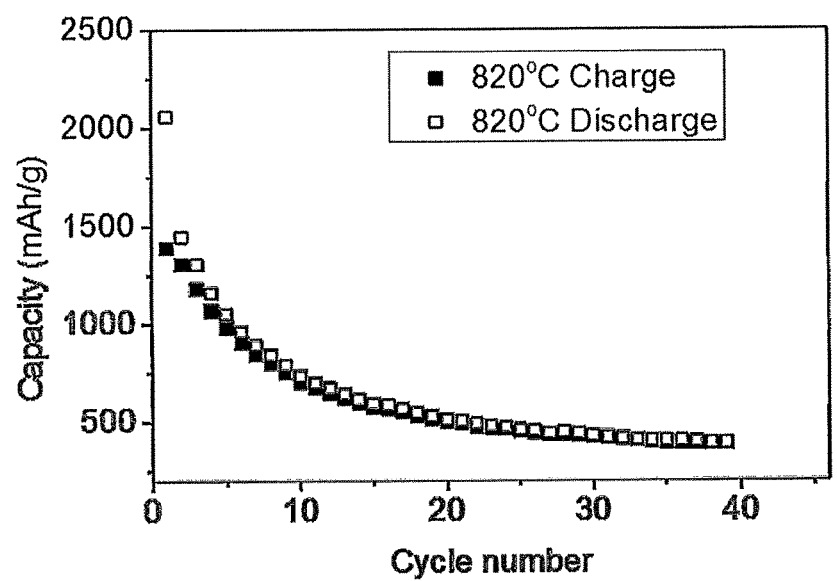

This relationship between surface area and reaction rate could be further demonstrated by a chemical reaction between PSi-600R with KOH aqueous solution. An extremely high average $H_2$ generating rate reaches 47.5 mmol$H_2$ s$^{-1}$ g$^{-1}$Si, which is about 30 times that of the highest previously reported result (1.5 mmol$H_2$ s$^{-1}$ g$^{-1}$ Si of embodiments of the invention shows photocatalytic reactivity under visible light (FIG. 4C). In contrast, no $H_2$ is generated under visible light from silicon nanopowders. The PSi also shows a much extended working life relative to previously reported results. After 55 hours (3 cycles, FIG. 4D), PSi-600R still shows acceptable photocatalytic $H_2$ evolution rate (~400 μmol$H_2$ h$^{-1}$ g$^{-1}$ Si) under visible light.

EXAMPLES

Embodiments of the invention are further described by way of examples. These are not exclusive, but are instead intended to show sample embodiments.

Preparation of PSi:

An NaK alloy (6 g) was added to 120 mL of toluene solution of anhydrous $SiCl_4$ (4 mL, 34 mmol, Aldrich 99%) in an argon filled glovebox. This mixture was heated under reflux for 4 h. After cooling the solution down to room temperature, the mixture was moved out of the glovebox. Then 20 mL of diethyl ether solution of hydrogen chloride (2M, Aldrich) was added slowly with stirring under the Ar. The raw products were collected by filtration and annealed (e.g. 600° C.) for 30 min under Ar atmosphere. The final product was obtained by removing the salts by-products with deionized (DI) water and dried in vacuum oven before use.

External $SiO_2$ template (e.g. 200 nm size) is used for generation of larger pores. 240 mg of $SiO_2$ was mixed with 4 mL $SiCl_4$ in 120 ml toluene in an Ar filled glovebox. The mixture was then mixed with 6 g of NaK alloy. After reflux for 4 hours, the mixture was cooled to room temperature and removed from the glovebox. Then 20 mL of diethyl ether solution of hydrogen chloride (2M, Aldrich) was added slowly with stirring under the Ar. The raw products were collected by filtration and annealed (e.g. 600° C.) for 30 min under Ar atmosphere. The final product was obtained by removing the salts and template with HF/HCl mixture and dried in vacuum oven before use.

P-type PSi was synthesized by a similar way. 0.4 ml $BCl_3$ was mixed with 4 mL $SiCl_4$ and then reduced by 6 g NaK alloy in 120 ml toluene. The following procedure was the same as described above. To remove the salts, only DI water is needed.

Electrochemical Measurements:

CR2016-type coin cells consisting of the PSi based electrode and lithium foil anode separated by a Celgard 2400 membrane were used for battery tests. The electrode contained 60 wt % active material, 20 wt % Super P and 20 wt % polyacrylic acid (PAA). The electrolyte was 1 M LiPF6 dissolved in a mixed solvent of ethylene carbonate (EC), ethyl methyl carbonate (1:2, v/v) with 10 wt % fluoroethylene carbonate (FEC) as additive. The density of the electrode is 0.72 g/cm3 and the loading of the active material is 1.4 mg/cm2. The cells were assembled in an argon-filled glove box (MBraun GmbH, Germany). The charge-discharge experiments were performed on a BT2000 battery testing system (Arbin Instruments, USA) in the potential range of 0.01-1.5 V using galvostatic charging and discharging method with different current rates. Lithium foil acted as both the reference and counter electrode. Electrochemical tests were performed at room temperature.

Solar Hydrogen Evolution:

Photocatalytic water splitting was performed in a gas-closed top window (quartz glass) Pyrex cell with a side septa neck for sampling, using 300-W Xe lamp as light source. The effective area for cell is 40.7 cm2. 0.1 ml gas samples were taken periodically and analyzed for hydrogen using a HP5890II gas chromatograph, with a thermal conductivity detector and a 2 m MSX 13× column. In all experiments, 70 mL of deionized water containing around 0.02 g of catalyst and the sacrificial agent methanol (scavenging the photo-generated holes) were added into reaction cell. The whole system was purged with argon for 30 minutes to remove dissolved air before reaction. Temperature for all photocatalytic reactions was kept at 25±5° C. A controlled experiment was carried out before characterization, and no appreciable $H_2$ was detected without photocatalyst.

We claim:

1. A process for production of porous crystalline silicon, comprising:
    reducing a silicon-halogenide precursor with at least one of an alkaline metal and an alkaline metal alloy to produce a silicon-salt matrix;
    annealing the silicon-salt matrix, thereby forming a plurality of salt crystals in a porous silicon structure; and
    washing the porous silicon structure with water, thereby providing a porous crystalline silicon.

2. The process of claim 1, wherein the silicon-halogenide precursor is selected from the group consisting of $SiCl_4$, $SiI_4$, $SiBr_4$, and $SiF_4$.

3. The process of claim 2, wherein the silicon-halogenide precursor is $SiCl_4$.

4. The process of claim 1, wherein the alkaline alloy is selected from the group consisting of sodium-potassium alloy (NaK), sodium metal, and sodium naphthanide.

5. The process of claim 1, wherein the alkaline alloy is NaK and other alkaline metal or alloy, and the silicon-halogenide precursor is $SiCl_4$.

6. The process of claim 1, wherein the process does not include contacting any member of the group consisting of the silicon-halogenide precursor, the silicon-salt matrix, and the porous silicon structure with hydrofluoric acid.

7. The process of claim 1, wherein the porous silicon structure includes a plurality of pores ranging in size from 1 nm to 200 nm, wherein the pore size is governed by the size of at least one external template.

8. The process of claim 1, wherein the porous silicon structure includes a plurality of pores distributed in an ordered distribution.

9. The process of claim 1, wherein the porous silicon structure has a total pore volume between 0.86 and 2.00 cm$^3$g$^{-1}$.

10. The process of claim 1, wherein the porous silicon structure has a surface area between 220 and 700 m$^2$g$^{-1}$.

11. The process of claim 1, wherein the silicon-halogenide precursor is mixed with an external template, wherein the porous silicon structure has an average pore size greater than 20 nm.

12. The process of claim 1, wherein the reducing step is conducted in a toluene solution.

13. The process of claim 9, wherein the porous silicon structure has a total pore volume between 0.86 and 1.44 $cm^3g^{-1}$.

14. The process of claim 10, wherein the porous silicon structure has a surface area between 220 and 580 $m^2g^{-1}$.

15. The process of claim 14, wherein the porous silicon structure has a surface area between 400 and 525 $m^2g^{-1}$.

16. The process of claim 1, wherein the porous silicon structure has a mean average pore diameter between 8 and 12 nm.

17. The process of claim 1, wherein the porous silicon structure has a mean average pore diameter less than 8 nm.

18. The process of claim 1 further comprising, prior to washing the porous silicon structure with water, calcining the porous silicon structure at a temperature from 600° C. to 950° C.

19. The process of claim 18 further comprising, prior to washing the porous silicon structure with water, calcining the porous silicon structure at a temperature from 650° C. to 900° C.

20. The process of claim 19, further comprising, prior to washing the porous silicon structure with water, calcining the porous silicon structure at a temperature from 700° C. to 800° C.

\* \* \* \* \*